United States Patent
Chen

(10) Patent No.: US 9,092,135 B2
(45) Date of Patent: Jul. 28, 2015

(54) CONTROL OF VIRTUAL OBJECT USING DEVICE TOUCH INTERFACE FUNCTIONALITY

(75) Inventor: Ruxin Chen, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 681 days.

(21) Appl. No.: 12/917,362

(22) Filed: Nov. 1, 2010

(65) Prior Publication Data

US 2012/0110447 A1 May 3, 2012

(51) Int. Cl.
G06F 3/0481 (2013.01)
G06F 3/0488 (2013.01)
G06F 1/16 (2006.01)

(52) U.S. Cl.
CPC .......... G06F 3/04886 (2013.01); G06F 1/1626 (2013.01); G06F 3/04815 (2013.01)

(58) Field of Classification Search
CPC ...... G06F 3/0481; G06F 3/0488; G06T 19/00
USPC .................................. 715/702; 345/173, 419
See application file for complete search history.

(56) References Cited

U.S. PATENT DOCUMENTS

| | | | |
|---|---|---|---|
| 5,483,261 A * | 1/1996 | Yasutake | 345/173 |
| 6,215,498 B1 * | 4/2001 | Filo et al. | 345/419 |
| 6,222,465 B1 * | 4/2001 | Kumar et al. | 341/20 |
| 6,278,418 B1 * | 8/2001 | Doi | 345/7 |
| 6,597,347 B1 * | 7/2003 | Yasutake | 345/173 |
| 7,020,326 B1 * | 3/2006 | Hsu | 382/155 |
| 7,199,301 B2 * | 4/2007 | Prittwitz | 84/615 |
| 7,215,323 B2 * | 5/2007 | Gombert et al. | 345/157 |
| 7,445,549 B1 * | 11/2008 | Best | 463/32 |
| 8,462,148 B1 * | 6/2013 | Reisman et al. | 345/419 |
| 2002/0036617 A1 * | 3/2002 | Pryor | 345/156 |
| 2003/0071795 A1 * | 4/2003 | Baldauf et al. | 345/173 |
| 2003/0156144 A1 * | 8/2003 | Morita | 345/848 |
| 2004/0233223 A1 * | 11/2004 | Schkolne et al. | 345/621 |
| 2007/0255468 A1 * | 11/2007 | Strebel et al. | 701/49 |
| 2008/0220878 A1 * | 9/2008 | Michaelis | 463/42 |
| 2009/0256809 A1 * | 10/2009 | Minor | 345/173 |
| 2011/0041098 A1 * | 2/2011 | Kajiya et al. | 715/849 |

(Continued)

FOREIGN PATENT DOCUMENTS

JP 2000293280 A 10/2000

OTHER PUBLICATIONS

International Search Report and Writeen Opinion of the International Searching Authority for PCT/US11/48507 mailed Jul. 30, 2013.

(Continued)

Primary Examiner — Phenuel Salomon
(74) Attorney, Agent, or Firm — Joshua D. Isenberg; JDI Patent

(57) ABSTRACT

A virtual object can be controlled using one or more touch interfaces. A location for a first touch input can be determined on a first touch interface. A location for a second touch input can be determined on a second touch interface. A three-dimensional segment can be generated using the location of the first touch input, the location of the second touch input, and a pre-determined spatial relationship between the first touch interface and the second touch interface. The virtual object can be manipulated using the three-dimensional segment in c) as a control input. The manipulated virtual object can be displayed on a display.

19 Claims, 8 Drawing Sheets

(56) References Cited

U.S. PATENT DOCUMENTS

2011/0050562 A1* 3/2011 Schoen et al. ............... 345/156
2012/0066648 A1* 3/2012 Rolleston et al. ............. 715/849

OTHER PUBLICATIONS

Japanese Office Action for JP Application No. 2013-537666, dated Oct. 21, 2014.

* cited by examiner

CONTROL OF VIRTUAL OBJECT USING DEVICE TOUCH INTERFACE FUNCTIONALITY

FIELD OF THE INVENTION

Embodiments of the present invention are related to devices that utilize touch interfaces and methods for controlling virtual objects using those touch interfaces.

BACKGROUND OF THE INVENTION

Handheld consumer electronic devices such as smart phones, portable internet devices, portable music players, and hand held gaming devices often include some form of visual display, such as a flat screen video display or a touch screen display. Touch screens are displays which also have the ability to detect the location of touches within the display area. This allows the display to be used as an input device, removing the keyboard and/or the mouse as the primary input device for interacting with the display's content. Such displays can be attached to computers or, as terminals, to networks. Touch screens also have assisted in recent changes in the design of personal digital assistants (PDAs), satellite navigation and mobile phone devices, making these devices more user-friendly.

Touch screens have become commonplace since the invention of the electronic touch interface in 1971 by Dr. Samuel C. Hurst. They have become familiar on PDAs, smart phones, and portable internet devices where a stylus or fingers are used to manipulate a graphical user interface (GUI) and to enter data. The popularity of smart phones, PDAs, portable game consoles, and many types of information appliances is driving the demand for, and the acceptance of, touch screens.

Currently, most devices that incorporate the use of touch interfaces use only a single touch interface per device. Because only a single touch interface is used, the manipulation of virtual objects displayed on those devices is limited. With a single touch interface, only 2-dimensional manipulation of virtual objects may be performed intuitively.

It is within this context that embodiments of the present invention arise.

BRIEF DESCRIPTION OF THE DRAWINGS

Embodiments of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
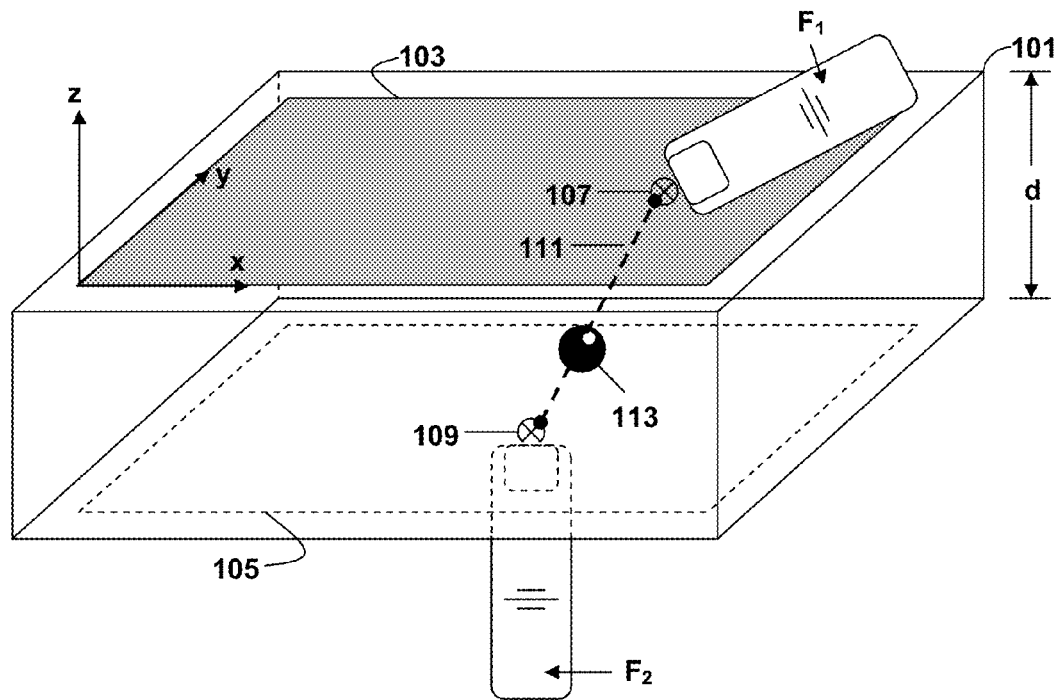
FIG. 1A is a 3-dimensional schematic diagram illustrating a device that uses direct touch for controlling a virtual object according to an embodiment of the present invention.

FIG. 1A is a 3-dimensional schematic diagram illustrating a device that utilizes direct touch for controlling a virtual object in accordance with an embodiment of the present invention. In this embodiment, a first touch interface 103 and a second touch interface 105 are both situated on a single device 101. In FIG. 1A, the touch interfaces 103, 105 are implemented as flat surfaces for the purpose of example, but not limitation. It is important to note that touch interfaces may be implemented in a variety of shapes and sizes including curved surfaces. The first touch interface 103 is situated on a front of the device 101, and will be referred to herein as the front touch interface. The second touch interface 105 is situated on a back of the device 101, and will be referred to herein as the rear touch interface. In some embodiments the front touch interface 103 or rear touch interface 105 may be implemented as a touch screen. A touch screen refers to a visual display which has the ability to detect the location of contact within the display area. Alternatively, the front touch interface 103 or rear touch interface 105 may be implemented as a touch pad. A touch pad refers to a touch interface that does not include a visual display. Instead, a user's contact with the touch pad can be communicated via a processor and, optionally, to an independent visual display.

Both the front touch interface 103 and the rear touch interface 105 are configured to determine the location of a touch input. By way of example, and not by way of limitation, the touch interfaces may be configured to determine the location of a touch input using resistive touch panels, surface acoustic wave technology, capacitive touch panels, infrared touch panels, strain gauge technology, optical imagining, dispersive signal technology, acoustic pulse recognition, or frustrated total internal reflection.

A resistive touch panel may be composed of several layers which may include two thin metallic electrically conductive and resistive layers separated by thin space. When an object (e.g., finger, stylus) comes in contact with this kind of touch panel, the layers are connected at a certain point. The panel then electrically acts similar to two voltage dividers with connected outputs. This causes a change in the electrical current which is registered as a touch event which may be sent to a processor for processing.

Surface Acoustic Wave technology uses ultrasonic waves that pass over the touch screen panel. When the panel is touched, a portion of the wave is absorbed. A sensor registers the resulting change in the ultrasonic waves and sends corresponding information to a processor for processing, which can determine the position of the touch event.

A capacitive touch panel may be coated with a material, e.g., indium tin oxide that conducts a continuous electrical current across the sensor. The sensor therefore exhibits a precisely controlled field of stored electrons in both the horizontal and vertical axes. When the capacitive touch panel's 'normal' capacitance field (its reference state) is altered by an externally applied electric field, e.g., from a user's finger, electronic circuits located at each corner of the panel measure a resultant 'distortion' in the characteristics of the reference field and send the information about the touch event to a processor for mathematical processing to determine the position of the touch event.

An infrared touch panel may employ one of two different methodologies. One method uses thermally induced changes of the surface resistance. Another method incorporates an array of vertical and horizontal IR sensors that detect interruption of a modulated light beam near the surface of the panel.

Some touch interfaces incorporate a spring gauge configuration. In this configuration the touch surface, e.g., a screen or touch pad, is spring mounted at each of its four corners and strain gauges are used to determine the deflection of the screen when touched. The position of the touch can be calculated from the deflection as determined by the strain gauges.

In touch interface technology based on optical imaging, two or more image sensors may be placed around the edges (mostly the corners) of the screen. Infrared backlights may be placed in a camera's field of view on the other sides of the screen. A touch shows up as a shadow and locations of the shadow as determined by each pair of cameras can then be triangulated to locate the position of the touch.

Dispersive signal technology may use sensors to detect mechanical energy in the glass touch panels that occurs due to a touch. Complex algorithms are then used to interpret this information to ultimately provide the actual location of the touch.

Touch panels based on acoustic pulse recognition may use more than two piezoelectric transducers located at some positions on the panel to turn the mechanical energy of a touch (vibration) into an electronic signal. This signal may then be converted into an audio file, and then compared to a pre-existing audio profile for every position on the screen in order to determine the location of the touch.

Touch panels based on frustrated total internal reflection use the principle of total internal reflection to fill a refractive medium with light. When a finger or other soft object is pressed against the surface of the panel, the internal reflection light path is interrupted, making the light reflect outside of the medium and thus visible to a camera behind the medium. The camera then processes this information to determine the location of the touch.

When a first finger $F_1$ comes in contact with the front touch interface 103, the front touch interface 103 will determine the location of this first touch input 107 with respect to the front touch interface 103. Similarly, when a second finger $F_2$ comes in contact with the rear touch interface 105, the rear touch interface 105 will determine the location of this second touch input 109 with respect to the rear touch interface 105. By way of example, and not by way of limitation, the touch input locations 107, 109 may be determined by selecting the centermost position of the entire surface that either finger $F_1$, $F_2$ comes in contact with using any of the touch panel technologies described above. It is important to note that a touch input may be realized by contact from objects other than fingers (e.g., stylus, controller, etc.)

Once the front touch interface 103 and the rear touch interface 105 have determined their respective touch input locations 107, 109, the device 101 can then generate a 3-dimensional segment 111 using the location of the first touch input 107, the location of the second touch input 109, and a pre-determined spatial relationship between the front touch interface 103 and the rear touch interface 105. By way of example, and not by way of limitation, the pre-determined spatial relationship between the front touch interface 103 and the rear touch interface 105 may be a multiple of the actual physical distance d between the two interfaces. In a relatively simple case, the front and rear touch interfaces may be of substantially the same size and shape and may be assumed to be in a parallel and overlapping relationship with respect to each other. It is noted that this case is a non-limiting example.

As an example of generation of the three dimensional segment 111 consider a case where the touch interfaces 103, 105 are in a substantially overlapping arrangement separated by a distance d. Locations of the touch inputs may be defined with respect to a common origin of an X-Y plane of a Cartesian co-ordinate system, which, for the sake of example, may be located on the surface of the first touch interface 103. The front touch input location 107. The first touch input location may be defined by x, y, z, coordinates $x_1$, $y_1$, and 0. The second touch input location 109 may be defined by x, y, z, coordinates $x_2$, $y_2$, $-d$. The direction and orientation of the segment 111 may expressed as a vector $(x_1-x_2)i+(y_1-y_2)j-dk$, where i, j, and k are unit segments in the x, y, and z directions respectively. The orientation of the segment 111 may alternatively be expressed in terms of Eulerian angles, i.e., angles of projections of the segment 111 onto the x-y, x-z, and y-z planes relative to the x, y, and z axes respectively. The magnitude of the segment 111 may be expressed in terms of a length L of the segment 111, which may be calculated using the well-known distance formula, e.g., as $L=\sqrt{(x_1-x_2)^2+(y_1-y_2)^2+d^2}$.

The three-dimensional segment 111 is then used as a control input for controlling the virtual object 113. By way of example, and not by way of limitation, the virtual object 113 may appear as though it is located between the front touch interface 103 and the rear touch interface 105. The virtual object 113 could also appear as though it is located behind the rear touch interface 105 or could assume any number of different orientations. For purposes of our example, we will assume that the virtual object 113 appears to be located between the front touch interface 103 and the rear touch interface 105. The three-dimensional segment 111 will pass through the virtual object 113, and any shift in position of the three-dimensional motion segment 111 will manipulate the orientation of the virtual object 113. Thus, any shift in the first touch input location 107 or any shift in the second touch input location 109 will cause the virtual object 113 to transform its orientation in accordance with the newly created three-dimensional segment 111 generated by those shifts.

Figure 1B:
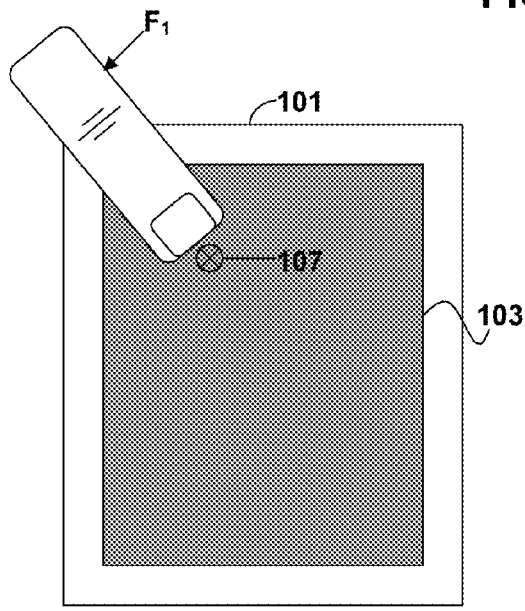
FIG. 1B is a top-view illustrating a device that uses direct touch for controlling a virtual object according to an embodiment of the present invention.

FIG. 1B is a top-view of the device 101 that utilizes direct touch for controlling a virtual object. The first finger $F_1$ comes in contact with the front touch interface 103, generating a first touch input location 107. That first touch input location 107 will then be used to generate a three-dimensional segment in accordance with the method described above.

Figure 1C:
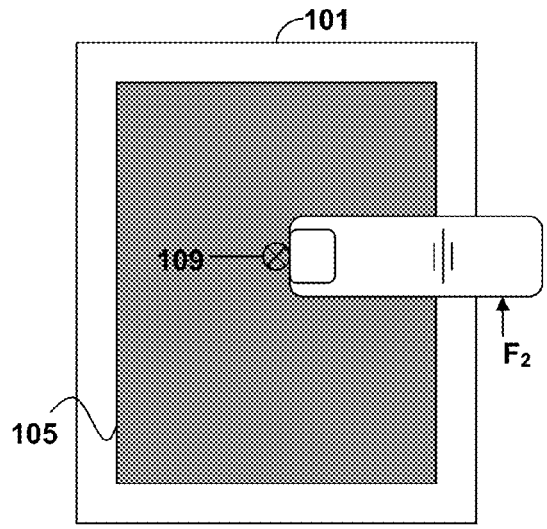
FIG. 1C is a bottom-view illustrating a device that uses direct touch for controlling a virtual object according to an embodiment of the present invention.

FIG. 1C is a bottom-view of the device 101 that utilizes direct touch for controlling a virtual object. The second finger $F_2$ comes in contact with the rear touch interface 105, generating a second touch input location 109. That second touch input location 107 will then be used to generate a three-dimensional segment in accordance with the method described above.

Figure 2A:
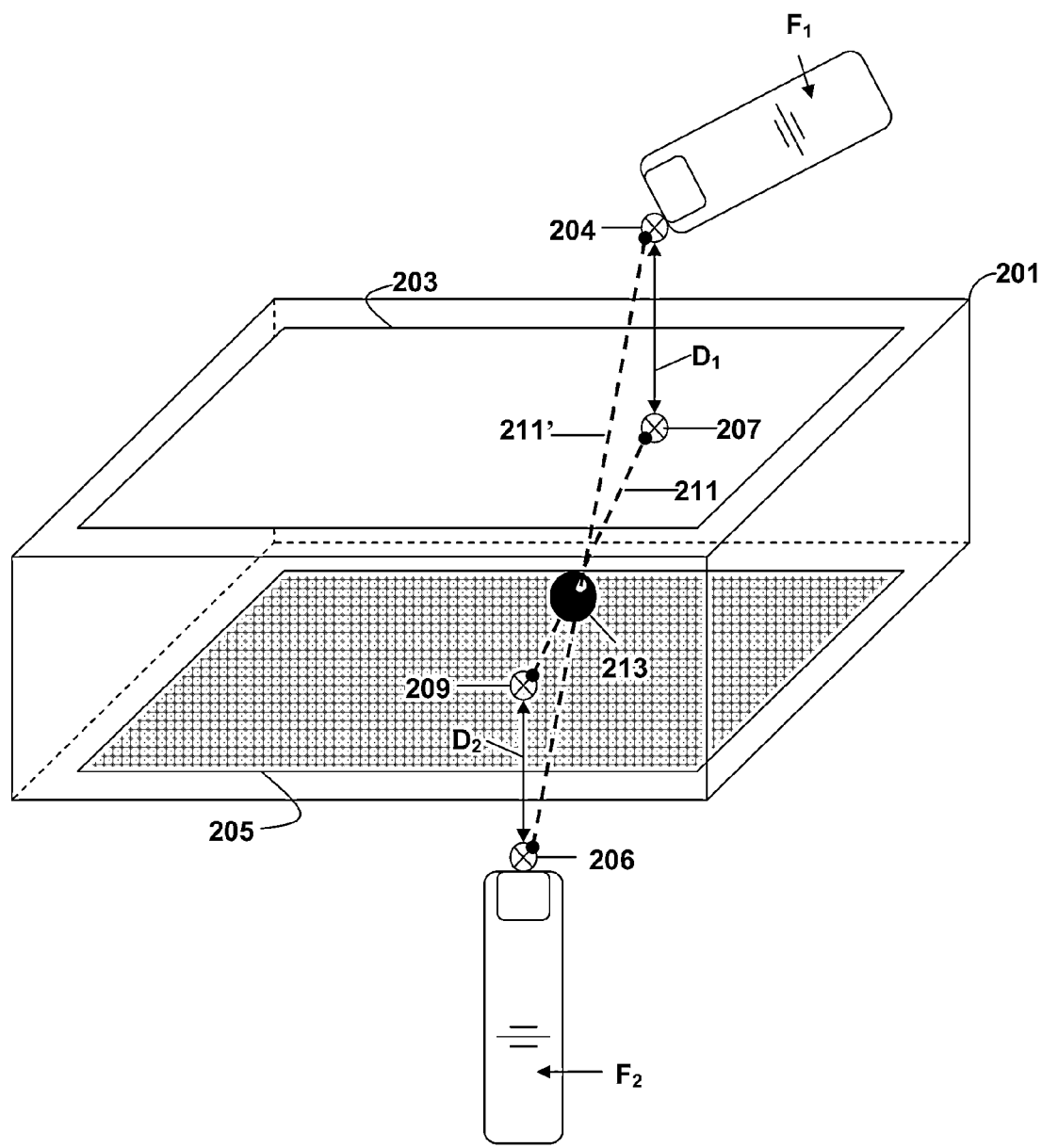
FIG. 2A is a 3-dimensional schematic diagram illustrating a device that uses pre-touch sensors for controlling a virtual object according to an embodiment of the present invention.

FIG. 2A is a three-dimensional schematic diagram of a device that uses pre-touch sensors for controlling a virtual object in accordance with another embodiment of the present invention. Again, the first touch interface 203 and the second touch interface 205 are situated on the same device 201. We will refer to the first touch interface 203 as the front touch interface and the second touch interface 205 as the rear touch interface. Much like the device in FIG. 1A, the front touch interface 203 and rear touch interface 205 of the present device 201 may be implemented as either a touch screen or a touch pad.

However, whereas the touch interfaces of FIG. 1A required direct contact to determine the location of touch inputs, the touch interfaces 203, 205 of FIG. 2A may generate touch input locations without direct contact. The front touch interface 203 and the rear touch interface 205 both use pre-touch sensors to determine touch input location. These pre-touch sensors may determine a touch input location whenever an object comes in close proximity to the touch interface, without actually coming in contact with it. For example, when a first finger $F_1$ comes in proximity to the front touch interface 203, the front touch interface 203 will determine the location of this first touch input 207. The location of the first finger $F_1$ in proximity to the front touch interface 203 will be referred to herein as the first point of application 204. The location of the first touch input 207 is characterized by the respective position of the first point of application on the front touch interface as established by the pre-touch sensors, as well as the perpendicular distance $D_1$ between the first point of application 204 and its respective position on the front touch interface 203. Likewise, when a second finger $F_2$ comes in proximity with the rear touch interface 205, the rear touch interface 205 will determine the location of this second touch input 209 in a manner equivalent to that used to determine the first touch input location.

Pre-touch sensors may be implemented in a variety of ways. By way of example, and not by way of limitation, pre-touch sensors may be implemented through the use of capacitive touch panels, infrared touch panels, optical imaging, or even surface acoustic wave technology. The implementation of these pre-touch technologies was described above. It is important to note that any touch interface's ability to determine object location is limited to objects that are within close proximity to the touch interface.

Once the location of the touch inputs 207, 209 are determined, the device 201 will control the virtual object 213 in a manner similar to that described above. The device 201 generates a three-dimensional segment 211 using the location of the first touch input 207, the location of the second touch input 209, and a pre-determined spatial relationship between the front touch interface 203 and the rear touch interface 205. Alternatively, the three-dimensional segment 211' may be determined between the points of application 204, 206. This three-dimensional segment 211' may be modified by lengthening or shortening the perpendicular distances $D_1$, $D_2$ between the points of application 204, 206 and their respective positions 207, 209 on the touch interfaces 203, 205. Finally, any shift in position of the three-dimensional motion segment 211, 211' will manipulate the orientation of the virtual object 213. It is important to note that the three-dimensional segment 211' generated by the points of application 204, 206 will provide for a more intuitive and effective user-experience when compared to the three-dimensional segment 211 generated by the two touch inputs 209, 211. This is because the three-dimensional segment 211' between the points of application 204, 206 possesses an extra degree of control (i.e., perpendicular distance between points of application and respective positions on touch interface)

Figure 2B:
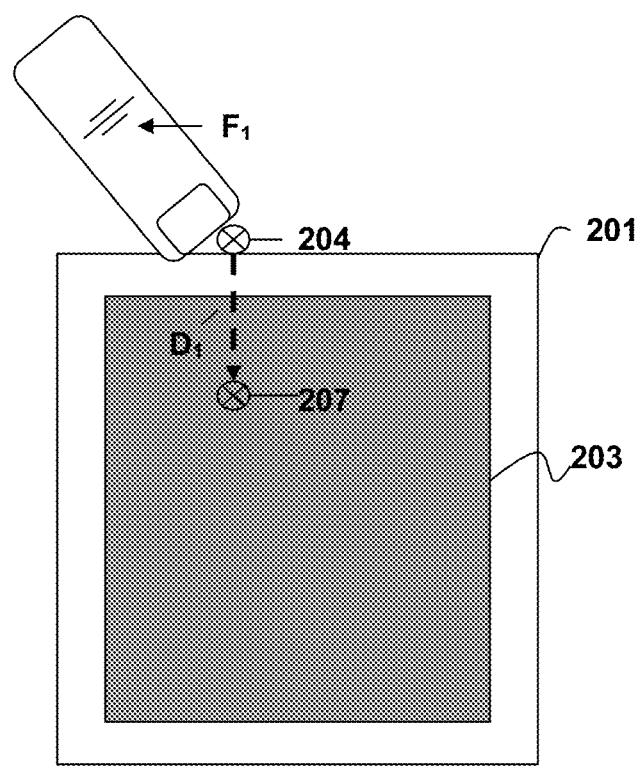
FIG. 2B is a top-view illustrating a device that uses pre-touch sensors for controlling a virtual object according to an embodiment of the present invention.

FIG. 2B is a top-view of the device 201 that uses pre-touch sensors for controlling a virtual object. The first finger $F_1$ comes in proximity to the front touch interface 203. The location of the first touch input 207 is then characterized by the respective position of the first point of application on the front touch interface as established by the pre-touch sensors, as well as the perpendicular distance $D_1$ between the first point of application 204 and its respective position on the front touch interface 203. That first touch input location 207 will then be used to generate a three-dimensional segment in accordance with the method described above.

Figure 2C:
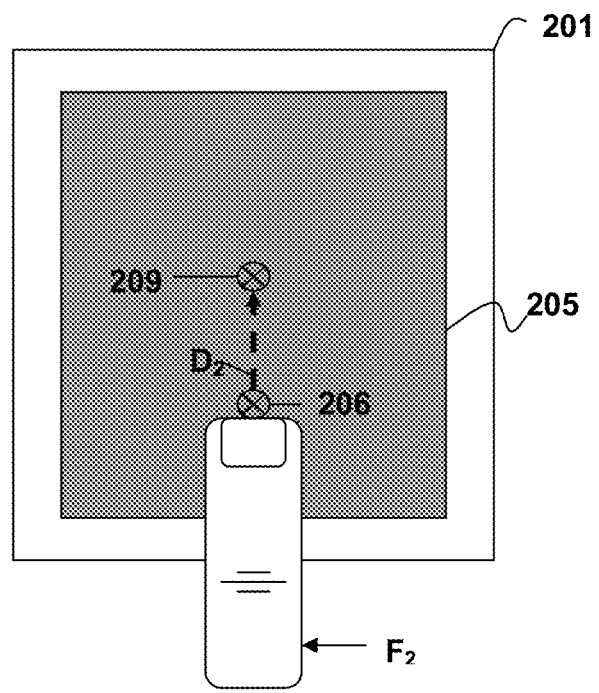
FIG. 2C is a bottom-view illustrating a device that uses pre-touch sensors for controlling a virtual object according to an embodiment of the present invention.

FIG. 2C is a bottom-view of the device 201 that uses pre-touch sensors for controlling a virtual object. The second finger $F_2$ comes in proximity to the rear touch interface 205. The location of the second touch input 209 is then characterized by the respective position of the second point of application on the rear touch interface as established by the pre-touch sensors, as well as the perpendicular distance $D_2$ between the second point of application 206 and its respective position on the second touch interface 205. That second touch input location 209 will then be used to generate a three-dimensional segment in accordance with the method described above.

Figure 3A:
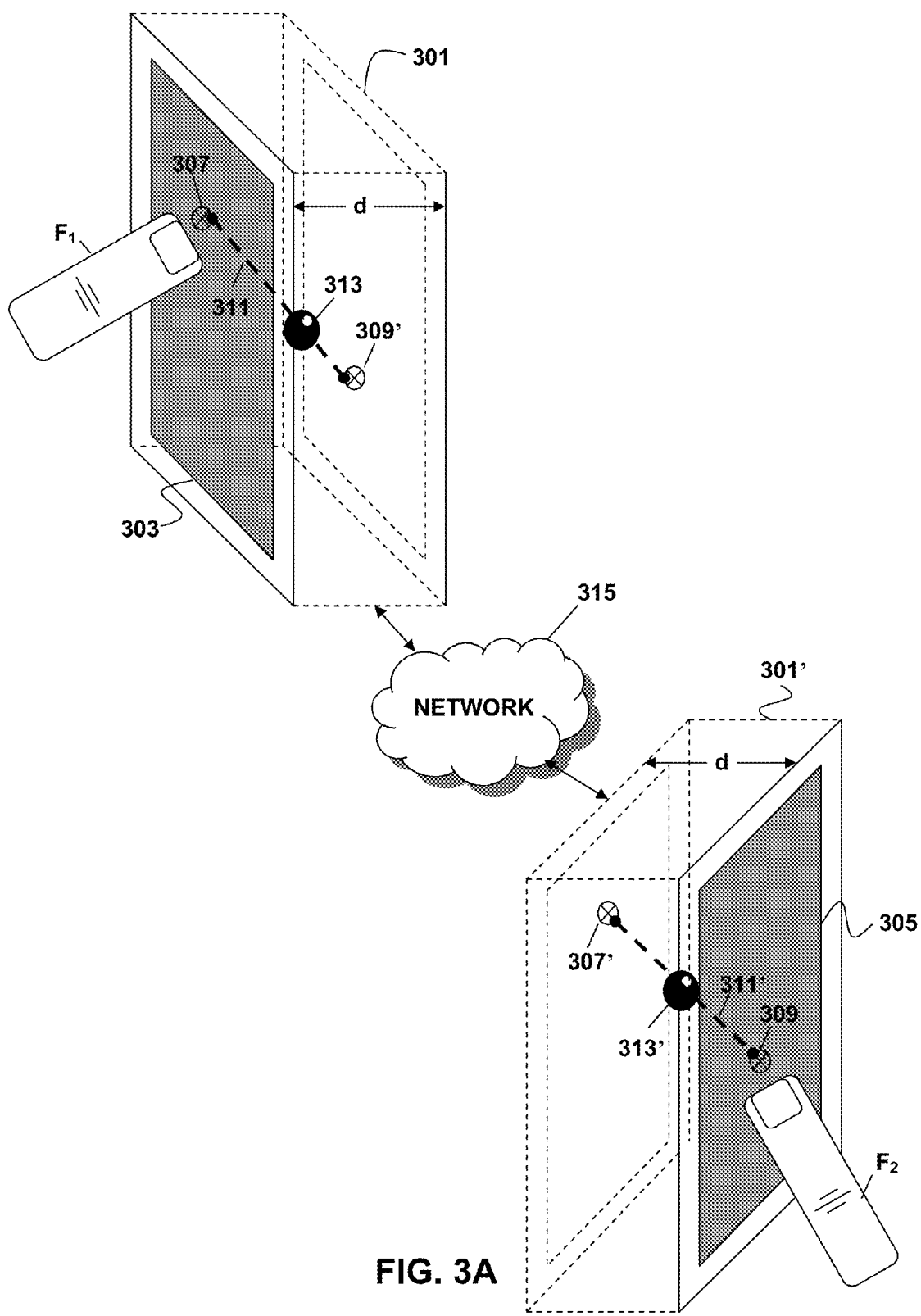
FIG. 3A is a 3-dimensional schematic diagram illustrating a method for controlling a virtual object using direct touch according to an embodiment of the present invention.
Figure 3B:
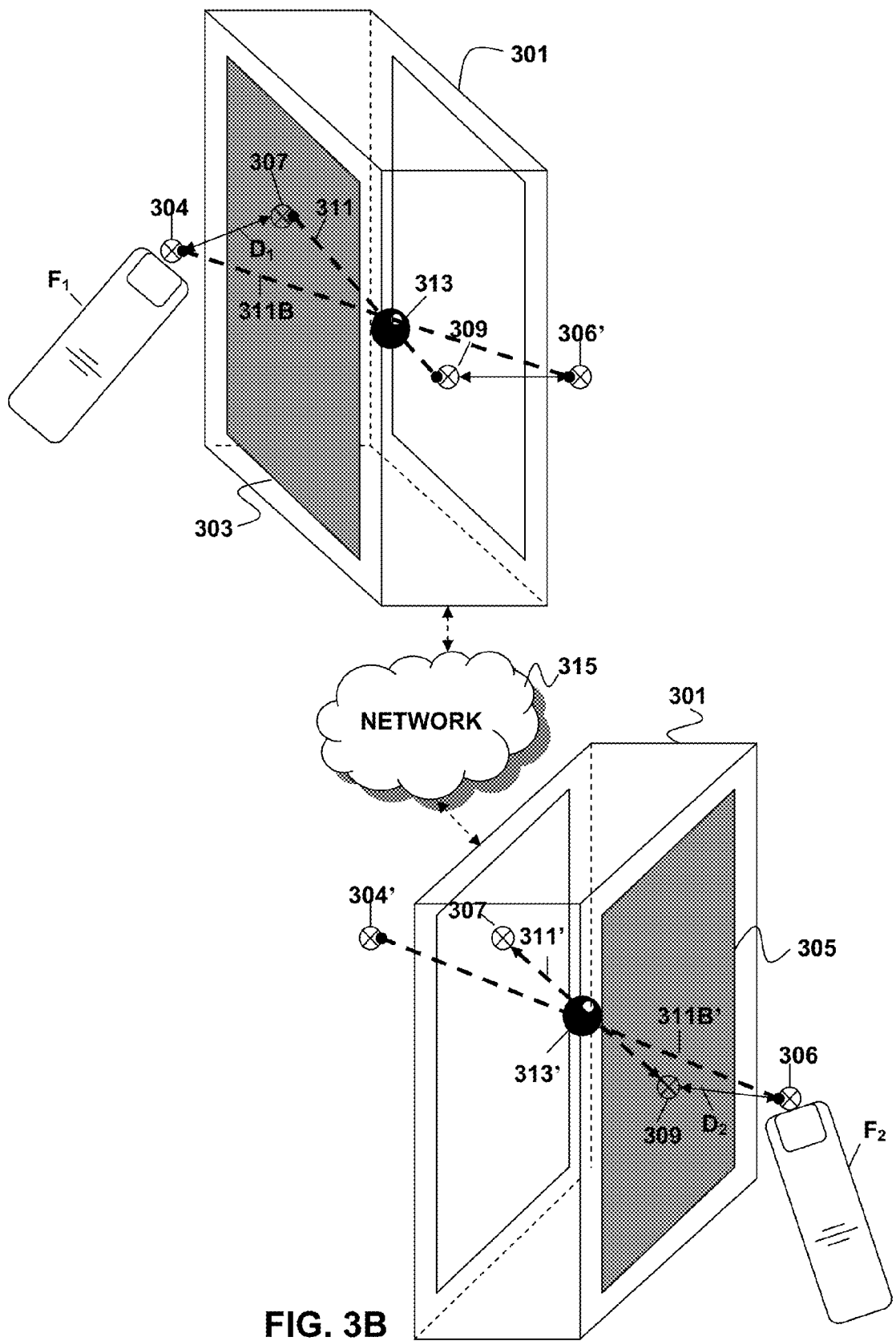
FIG. 3B is a 3-dimensional schematic diagram illustrating a method for controlling a virtual object using pre-touch according to an embodiment of the present invention.

The previous examples illustrate methods for controlling a virtual object using a single device. However, situations may arise where more than one user control the same virtual object. By way of example, and not by way of limitation, two users may be involved in a virtual world, where they are working together to control a virtual object. FIG. 3A and 3B are 3-dimensional schematic diagrams illustrating a method for controlling a virtual object in accordance with an embodiment of the present invention. FIG. 3A illustrates the method using direct touch technology and FIG. 3B illustrates the method using pre-touch technology. A first user operates a first device 301, which contains a first touch interface 303. A second user operates a second device 301', which contains a second touch interface 305. These two users can be connected over a network 315. By way of example, and not by way of limitation, the network may be implemented using wired or wireless connection, such as Bluetooth radiofrequency technology, infrared signals, and the like. The user users may then work in concert to control the same virtual object 313.

The location of the first touch input 307 with respect to the touch interface 303 of the first device 301 can be determined by the first user's finger's $F_1$ interaction with the first touch interface 303 (i.e., by direct touch or pre-touch), e.g., as described above. The location of the second touch input 309 with respect to the second touch interface 305 can be determined by the second user's finger's $F_2$ interaction with the second touch interface 305 (i.e., by direct touch or pre-touch) also previously described above. Alternatively, the location of the first point of application 304 and the location of the second point of application 306 may also be determined using pre-touch technology as described in FIG. 2A. The location of the first touch input 307 (or first point of application 304) is sent over the network 315 to the second device 301'. Similarly, the location of the second touch input 309 (or second point of application 306) is sent over the network 315 to the first device 301.

The location of the first touch input 307 (or first point of application 304) can be mapped onto the second device 301' in accordance with its location on or proximity to the first touch interface 303, and will referred to herein as the location of the projected first touch input 307' (or alternatively the location of the projected first point of application 304'). Similarly, the location of the second touch input 309 (or second point of application 306) is mapped onto the first device 301 in accordance with its location on or proximity to the second touch interface 305, and will be referred to herein as the location of the projected second touch input (or alternatively the location of the projected second point of application 306').

The first device 301 can then generate a three-dimensional segment 311 using the location of the first touch input 307, the location of the projected second touch input 309', and a pre-determined spatial relationship between the first touch interface and the second touch interface. Likewise, the second device 301' will generate a three-dimensional segment 311' using the location of the second touch input 309, the location of the projected first touch input 307' and a pre-determined spatial relationship between the first touch interface and the second touch interface. By way of non-limiting example, the pre-determined spatial relationship may assume that the first and second touch interfaces 303, 305 are in a parallel and overlapping arrangement separated by a distance d. However, any arbitrary relationship between the two touch interfaces 303, 305 may be used, e.g., one where they are non-parallel.

Alternatively, the first device 301 may generate a three-dimensional segment 311B using the location of the first point of application 304 and the location of the projected second point of application 306', as described in FIG. 2A. Similarly, the second device 301' may generate a three-dimensional segment 311B' using the location of the projected first point of application 304' and the location of the second point of application 306, as described in FIG. 2A. These three-dimensional segments 311B, 311B' may be modified by lengthening or shortening the perpendicular distances $D_1$, $D_2$ between the points of application 304, 306 and their respective positions 307, 309 on the touch interfaces 303, 305. As discussed above, the three-dimensional segment 311B, 311B' generated using the points of application 304, 306 may be preferred over the three-dimensional segment 311, 311' generated using the touch inputs because of the additional degree of control it provides.

For purposes of our example, assume that the virtual object 313, 313' in each device appears to be located between the device's touch interface 303, 305 and the plane of the location of the projected touch inputs 309', 307'. Each three-dimensional segment 311, 311', 311B, 311B' initially passes through the virtual object 313, 313', and any shift in position of the three-dimensional segment 311, 311', 311B, 311B' will manipulate the orientation of the virtual object 313, 313'. Because the virtual object 313, 313' is being controlled by two separate devices, 301, 301', each device may only control one end of the three-dimensional segment 311, 311', 311B, 311B'. For example, the user of the first device 301 may control the location of the first touch input 307 (or first point of application 304), but is unable to control the location of the projected second touch input 309' (or projected second point of application 306') as that is controlled by the user of the second device 301'. Likewise, the user of the second device 301' may control the location of the second touch input 309 (or second point of application 306), but is unable to control the location of the projected first touch input 307' (or projected first point of application 304') as that is controlled by the user of the first device 301. Although both users see the virtual object 313, 313' from their own individual perspectives, the control of the virtual object is dependent the interaction between the two user's over the network 315.

The control of a virtual object using the methods described above may be exercised in a number of different ways. FIG. 4A-4D are schematic diagrams illustrating a few examples of possible ways to control a virtual object in accordance with an embodiment of the present invention. The location of the first touch input with respect to the first touch interface (or location of the first point of application) 407 is determined by a first finger's $F_1$ interaction with the first touch interface (i.e., direct touch or pre-touch). Similarly, the location of the second touch input with respect to the second touch interface (or location of the second point of application) 409 is determined by a second finger's $F_2$ interaction with the second touch interface (i.e., direct touch or pre-touch). For purposes of our example, it can be assumed that the virtual object 413 appears to be located between the first touch interface and the second touch interface. The location of the first touch input (or location of the first point of application) 407, the location of the second touch input (or location of the second point of application) 409, and a pre-determined spatial relationship between the two touch interfaces (e.g., actual physical distance between touch interfaces) are used to generate a 3-dimensional segment 411. The three-dimensional segment 411 is then used as a control input for controlling the virtual object 413. The three-dimensional motion segment 411 will initially pass through the virtual object 413, and any shift in position of the three-dimensional motion segment 411 will manipulate the orientation of the virtual object 413.

Figure 4A:
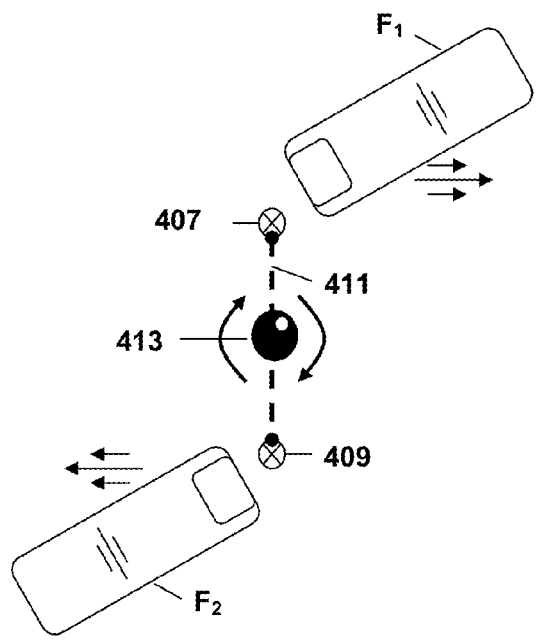
FIG. 4A is a schematic diagram illustrating a method for rotating a virtual object according to an embodiment of the present invention.

FIG. 4A illustrates a method of rotating the virtual object in accordance with an embodiment of the present invention. Moving the first finger $F_1$ and the second finger $F_2$ in opposite directions will cause the virtual object 413 to rotate. Changes in the orientation of the segment 411 can be mapped to changes in the orientation of the object 413. By adjusting the rate of finger movement, a user can control the rotational velocity of the virtual object 413. For example, when the fingers are slowly moved in opposite directions, the virtual object 413 can correspondingly rotate slowly. When the fingers are quickly pulled in opposite directions, the virtual object 413 can correspondingly rotate quickly as the orientation of the segment 411 changes. Additionally, one can control the direction in which the virtual object 413 rotates by changing the direction in which the fingers are moved. It is important to note that the virtual object 413 may also be rotated by simply shifting one finger and leaving the other finger in place. By way of example, and not by way of limitation, this motion could propagate indefinitely by shifting one finger a set distance, bringing it back to its original position, and shifting it again a set distance, repeating these movements for as long as a user intends to keep the virtual object 413 rotating. Furthermore, increasing the length of the three dimensional segment 411 past a certain threshold may indicate a release of the rotation.

Figure 4C:
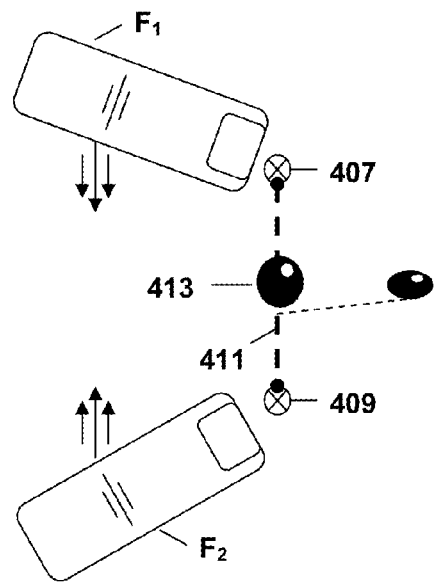
FIG. 4C is a schematic diagram illustrating a method for squeezing or compressing a virtual object according to an embodiment of the present invention.
Figure 4B:
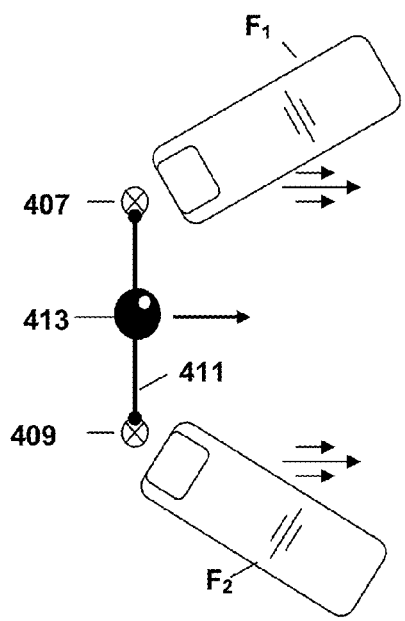
FIG. 4B is a schematic diagram illustrating a method for shifting a virtual object according to an embodiment of the present invention.

FIG. 4B illustrates a method for shifting the virtual object in accordance with an embodiment of the present invention.

Moving the first finger $F_1$ and the second finger $F_2$ in the same direction causes the virtual object 413 to shift as the segment 411 shifts. If the fingers move at the same rate, then the virtual object 413 will proceed in a straight line in the direction of the finger movement. To alter the angle at which the virtual object 413 moves, one can adjust the rate of movement of one finger relative to the other finger. For example, if the first finger $F_1$ moves at a quicker rate than the second finger, the virtual object 413 may move in the direction of both fingers, with the movement angled towards the position of the first finger $F_1$. Similarly, if the second finger $F_2$ moves at a quicker rate than the first finger, the virtual object 413 may move in the direction of both fingers, with the movement angled towards the position of the second finger $F_2$. Additionally, the angle of the three dimensional segment 411 with respect to the touch interfaces may provide another degree of directional control of the virtual object 413. For example, if the virtual object 413 takes on the form of a bullet, the bullet will move in a direction perpendicular to the three-dimensional segment 411, dependent on the movement of the fingers.

FIG. 4C illustrates a method for squeezing/compressing a virtual object in accordance with an embodiment of the present invention. Within the context of direct touch, increasing the pressure that the first finger $F_1$ exerts on the first touch interface and increasing the pressure that the second finger $F_2$ exerts on the second touch interface will cause the virtual object 413 to compress. One can imagine exerting different combinations of finger pressure on the respective touch interfaces to modify the compression of the virtual object 413. The process for compressing a virtual object 413 using pre-touch sensors is slightly different than the process for compressing a virtual object 413 using direct touch. Rather than exerting more force on a touch interface, decreasing the perpendicular distance between a finger's point of application and its respective position on the touch interface will cause the virtual object to compress. One can imagine using different combinations of perpendicular distances to modify the compression of the virtual object 413.

Figure 4D:
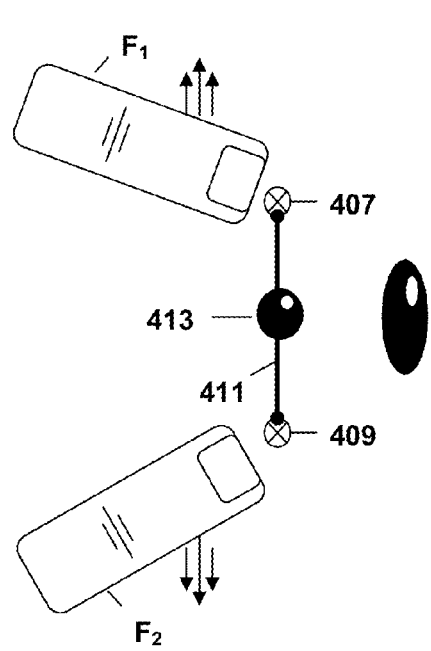
FIG. 4D is a schematic diagram illustrating a method for expanding a virtual object according to an embodiment of the present invention.

FIG. 4D illustrates a method for expanding a virtual object in accordance with an embodiment of the present invention. Within the context of direct touch, decreasing the pressure that the first finger $F_1$ exerts on the first touch interface and decreasing the pressure that the second finger $F_2$ exerts on the second touch interface will cause the virtual object 413 to expand. One can imagine exerting different combinations of finger pressure on the respective touch interfaces to modify the expansion of the virtual object 413. The process for expanding a virtual object 413 using pre-touch sensors is slightly different than the process for expanding a virtual object 413 using direct touch. Rather than exerting less force on a touch interface, increasing the perpendicular distance between a finger's point of application and its respective position on the touch interface will cause the virtual object to expand. One can imagine using different combinations of perpendicular distance to modify the expansion of the virtual object 413.

It is important to note that these are merely a few examples of methods for controlling a virtual object. It is possible to use other alternative methods as well as combining two or more of the aforementioned methods for controlling a virtual object.

Figure 5:
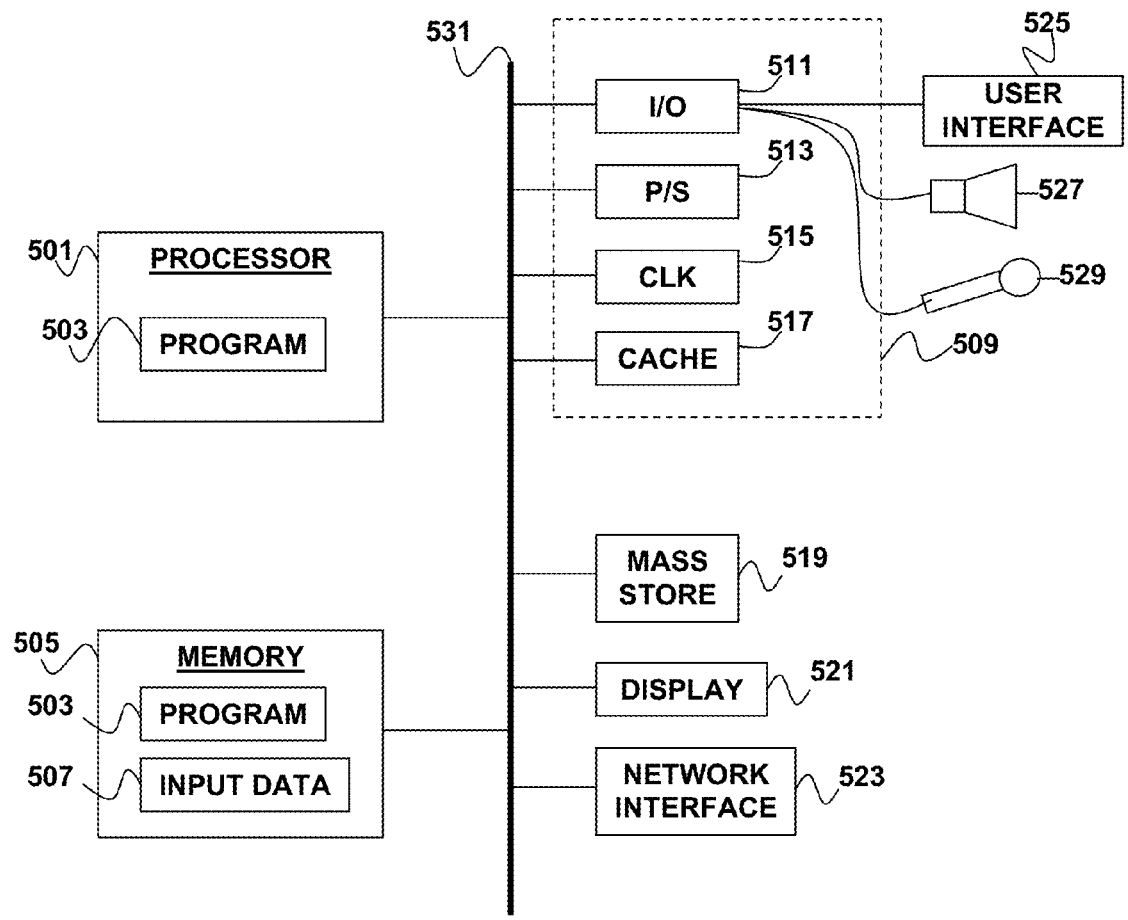
FIG. 5 is a block diagram illustrating an apparatus for controlling a virtual object according to an embodiment of the present invention.

FIG. 5 illustrates a block diagram of a computer apparatus 500 that may be used to implement control of a virtual object as described above. The apparatus 500 generally includes a processor module 501 and a memory 505. The processor module 501 may include one or more processor cores. As an example of a processing system that uses multiple processor modules, is a Cell processor, examples of which are described in detail, e.g., in *Cell Broadband Engine Architecture*, which is available online at http://www-306.ibm.com/chips/techlib/techlib.nsf/techdocs/1AEEE1270EA2776387257060006E61B A/$file/CBEA_01_pub.pdf, which is incorporated herein by reference.

The memory 505 may be in the form of an integrated circuit, e.g., RAM, DRAM, ROM, and the like. The memory may also be a main memory that is accessible by all of the processor modules 501. In some embodiments, the processor module 501 may include local memories associated with each core. A program 503 may be stored in the main memory 505 in the form of processor readable instructions that can be executed on the processor modules 501. The program 503 may be configured to control a virtual object using two touch interfaces, e.g. as described above with respect to FIG. 1, FIG. 2, FIG. 3, and FIG. 4. The program 503 may be written in any suitable processor readable language, e.g., C, C++, JAVA, Assembly, MATLAB, FORTRAN, and a number of other languages. Input data 507 may be stored in the memory 505. During execution of the program 503, portions of program code and/or data 507 may be loaded into the memory 505 or the local stores of processor cores for parallel processing by multiple processor cores. By way of example, and not by way of limitation, the input data 507 may include locations of touch inputs (both direct touch and pre-touch), and also three-dimensional segments generated by the touch inputs.

The program 503 may include instructions that when executed by the processor 501 implement a method for controlling a virtual object by a) determining a location for a first touch input on a first touch interface; b) determining a location for a second touch input on a second touch interface; c) generating a three-dimensional segment using the first touch input, the second touch input, and a pre-determined spatial relationship between the first touch interface and the second touch interface; d) manipulating the virtual object using the three-dimensional segment as a control input; and e) displaying the manipulated virtual object.

The apparatus 500 may also include well-known support functions 509, such as input/output (I/O) elements 511, power supplies (P/S) 513, a clock (CLK) 515, and a cache 517. The apparatus 500 may optionally include a mass storage device 519 such as a disk drive, CD-ROM drive, tape drive, or the like to store programs and/or data. The apparatus 500 may also optionally include a display unit 521 and a user interface unit 525 to facilitate interaction between the apparatus 500 and a user. The display unit 521 may be in the form of a cathode ray tube (CRT) or flat panel screen that displays text, numerals, graphical symbols or images. The user interface 525 may include a keyboard, mouse, joystick, light pen, or other device that may be used in conjunction with a graphical user interface (GUI). The apparatus 500 may also include a network interface 523 to enable the device to communicate with other devices over a network, such as the internet.

The system 500 may optionally include one or more audio speakers 527 that are coupled to the processor 501 via the I/O elements 511. The speakers can play sounds generated in response to signals generated by execution of the program 503. The audio speakers 527 can be used, e.g., when the movement of the virtual object creates a 3-D sound effect. In some embodiments, the system 500 may include an optional microphone 529, which may be a single microphone or a microphone array. The microphone 529 can be coupled to the processor 501 via the I/O elements 511. By way of example, and not by way of limitation, different 3-D sound effects may be generated by tracking both the location of the sound source using the microphone array 529 and the location of the virtual object.

Furthermore, by combining tracking a three-dimensional real sound source location with a microphone array with 3-D virtual object location, one can generate different 3D sound effect. For example, a virtual mirror can be used to bounce real sound in a specific direction so that only one of the audio speakers 527 produces corresponding sounds.

The components of the system 500, including the processor 501, memory 505, support functions 509, mass storage device 519, user interface 525, network interface 523, and display 521 may be operably connected to each other via one or more data buses 531. These components may be implemented in hardware, software or firmware or some combination of two or more of these.

Figure 6:
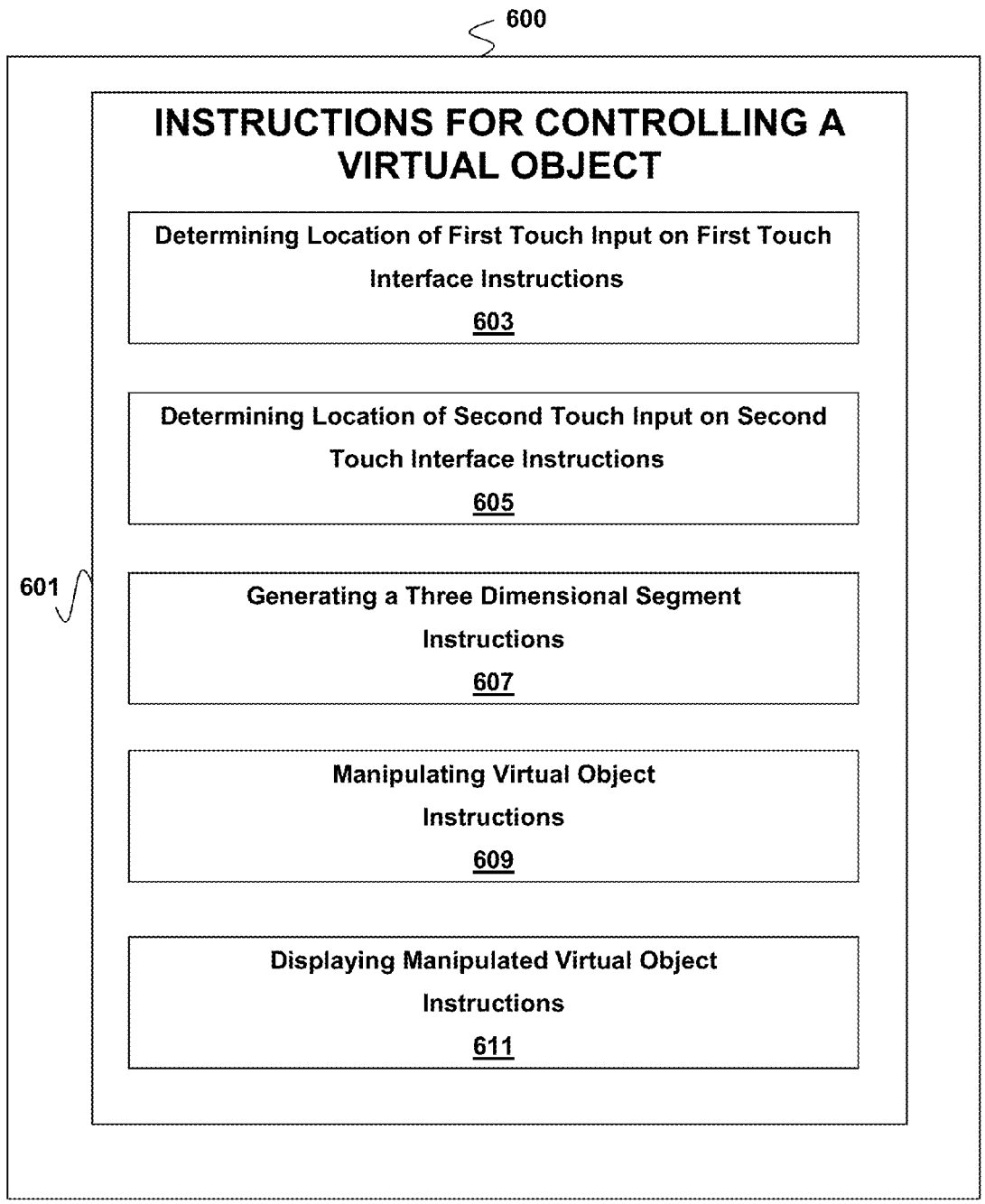
FIG. 6 illustrates an example of a non-transitory computer-readable storage medium with instructions for implementing control of a virtual object according to an embodiment of the present invention.

According to another embodiment, instructions for controlling a virtual object may be stored in a computer readable storage medium. By way of example, and not by way of limitation, FIG. 6 illustrates an example of a non-transitory computer-readable storage medium 600 in accordance with an embodiment of the present invention. The storage medium 600 contains computer-readable instructions stored in a format that can be retrieved, interpreted, and executed by a computer processing device. By way of example, and not by way of limitation, the computer-readable storage medium 600 may be a computer-readable memory, such as random access memory (RAM) or read only memory (ROM), a computer readable storage disk for a fixed disk drive (e.g., a hard disk drive), or a removable disk drive. In addition, the computer-readable storage medium 600 may be a flash memory device, a computer-readable tape, a CD-ROM, a DVD-ROM, a Blu-Ray, HD-DVD, UMD, or other optical storage medium.

The storage medium 600 contains instructions 601 configured to control and manipulate a virtual object through touch. The Instructions for Controlling a Virtual Object 601 may be configured to implement control of a virtual object in accordance with the methods described above with respect to FIG. 1, FIG. 2, FIG. 3, and FIG. 4. In particular, the Instructions for Controlling a Virtual Object 601 may include Determining Location of First Touch Input on First Touch Interface Instructions 603 that are used to determine the location of a first touch input with respect to the first touch interface. The Instructions for Controlling a Virtual Object 601 may further include Determining Location of Second Touch Input on Second Touch Interface Instructions 605 that are used to determine the location of a second touch input with respect to the second touch interface. The locations of the touch inputs may be determined by way of direct contact or pre-touch sensors as described above with respect to FIGS. 1A-1C and FIGS. 2A-2C. These instructions may also be configured to save each user's individualized touch arrangement to take into account individual finger lengths and finger movement rates.

The Instructions for Controlling a Virtual Object 601 may also include Generating a Three Dimensional Segment Instructions 607 that are used to generate a three-dimensional segment using the location of the first touch input, the location of the second touch input, and a pre-determined spatial relationship between the first touch interface and a second touch interface. This may trigger one or more Manipulating Virtual Object Instructions 609 that manipulate the orientation of the virtual object using the three-dimensional segment as a control input.

The Instructions for Controlling a Virtual Object 601 may further include Displaying Manipulated Virtual Object Instructions 611 that are used to display the manipulated virtual object to one or more users. These instructions may also include directions for playing particular sound effects (e.g., 3-D sound effects) in accordance with any three-dimensional control segment generated or any finger movements made.

Although the present invention has been described in considerable detail with reference to certain preferred versions thereof, other versions are possible. For example, although certain embodiments are described in which the three-dimensional segment is defined in terms of Cartesian coordinates, those of skill in the art will recognize that the segment can be defined in terms of other coordinate systems, such as cylindrical or polar spherical coordinates. In addition it is noted that some embodiments are described in which an overlapping parallel relationship is assumed between the first and second touch interfaces. However, embodiments of the invention may be implemented with any relationship between the two touch interfaces. For example, the two interfaces may be in a non-parallel, e.g., mutually perpendicular, relationship. Furthermore, there may be a skew or lateral offset between the first and second touch interfaces. Therefore, the spirit and scope of the appended claims should not be limited to the description of the preferred versions contained herein. Instead, the scope of the invention should be determined with reference to the appended claims, along with their full scope of equivalents.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

The reader's attention is directed to all papers and documents which are filed concurrently with this specification and which are open to public inspection with this specification, and the contents of any papers and documents incorporated herein by reference.

What is claimed is:

1. A method for controlling a virtual object, comprising:
    a) determining a location for a first touch input on a first touch interface, wherein determining the location of the first touch input involves using pre-touch to determine a position of the first touch input on the first touch interface and a perpendicular distance between that position and a point of application of touch;
    b) determining a location for a second touch input on a second touch interface, wherein determining the location of the second touch input involves using pre-touch to determine a position of the second touch input on the second touch interface and a perpendicular distance between that position and a point of application of touch;
    c) generating a three-dimensional segment having an orientation determined by the location of the first touch input, the location of the second touch input, and a pre-determined spatial relationship between the first touch interface and the second touch interface; and
    d) manipulating the virtual object using the three-dimensional segment in c) as a control input.

2. The method of claim 1, wherein the first touch interface is a touch screen.

3. The method of claim 2, wherein the second touch interface is a touch pad.

4. The method of claim 1, wherein the first touch interface in a) is situated on a first device and the second touch interface in b) is situated on a second device.

5. The method of claim 4, wherein the first device and the second device are connected over a wireless network.

6. The method of claim 1, further comprising:
 e) displaying the manipulated virtual object on a display.

7. The method of claim 6, wherein e) includes displaying the virtual object on a display separate from a device containing the first touch interface and a device containing the second touch interface.

8. The method of claim 6, wherein e) includes displaying the virtual object on a first touch screen.

9. The method of claim 8, wherein e) also includes displaying the virtual object on a second touch screen.

10. An apparatus for controlling a virtual object, comprising:
 a first touch interface;
 a second touch interface;
 a processor operably coupled to the first touch interface; and
 instructions executable by the processor configured to:
 a) determine a location of a first touch input on the first touch interface, wherein determining the location of the first touch input involves using pre-touch to determine a position of the first touch input on the first touch interface and a perpendicular distance between that position and a point of application of touch;
 b) determine a location of a second touch input on the second touch interface, wherein determining the location of the second touch input involves using pre-touch to determine a position of the second touch input on the second touch interface and a perpendicular distance between that position and a point of application of touch;
 c) generate a three-dimensional segment having an orientation determined by the location of the first touch input, the location of the second touch input, and a pre-determined spatial relationship between the first touch interface and the second touch interface; and
 d) manipulate the virtual object using the three-dimensional segment in c) as a control input.

11. The apparatus in claim 10, wherein the processor is further operably coupled to the second touch interface; and the first touch interface and the second touch interface are both situated on a case having first and second major surfaces.

12. The apparatus in claim 11, wherein the first touch interface is a touch screen located on the first major surface.

13. The apparatus in claim 12, wherein the second touch interface is a touch pad located on the second major surface.

14. The apparatus in claim 10, wherein the first touch interface in a) is situated on a first device and the second touch interface in b) is situated on a second device.

15. The apparatus in claim 14, wherein the first device and the second device are connected over a wireless network.

16. The apparatus in claim 10, further comprising a visual display separate from a device containing the first touch interface and a device containing the second touch interface.

17. The apparatus of claim 10, wherein the instructions executable by the processor are further configured to:
 e) display the manipulated virtual object.

18. A computer program product comprising:
 a non-transitory computer-readable storage medium having computer readable program code embodied in said medium for controlling a virtual object using two touch interfaces, said computer program product having:
 a) computer readable program code means for determining a location of a first touch input on a first touch interface, wherein determining the location of the first touch input involves using pre-touch to determine a position of the first touch input on the first touch interface and a perpendicular distance between that position and a point of application of touch;
 b) computer readable program code means for determining a location of a second touch input on a second touch interface, wherein determining the location of the second touch input involves using pre-touch to determine a position of the second touch input on the second touch interface and a perpendicular distance between that position and a point of application of touch;
 c) computer readable program code means for generating a three-dimensional segment having an orientation determined by the location of the first touch input, the location of the second touch input, and a pre-determined spatial relationship between the first touch interface and the second touch interface; and
 d) computer readable program code means for manipulating the virtual object using the three-dimensional segment in c) as a control input.

19. The computer program product of claim 18, further comprising:
 e) computer readable program code means for displaying the manipulated virtual object.

* * * * *